United States Patent

Newell

[11] 4,354,516
[45] Oct. 19, 1982

[54] AUTOMATIC CONTROL VALVE

[76] Inventor: Ronald Newell, 118 Poplar Rd., St. Mary's, Pa. 15857

[21] Appl. No.: 200,468

[22] Filed: Oct. 24, 1980

[51] Int. Cl.³ .............................................. F16K 19/00
[52] U.S. Cl. ....................................... 137/98; 137/114; 251/118; 251/339
[58] Field of Search .................. 137/98, 111, 114, 99, 137/499; 251/118, 339; 261/69 R

[56] References Cited

U.S. PATENT DOCUMENTS

| | | | |
|---|---|---|---|
| 616,243 | 12/1898 | Mayer | 137/98 |
| 843,080 | 2/1907 | Ermentrout | 137/111 |
| 895,709 | 8/1908 | Abernethy | 137/114 X |
| 1,937,893 | 12/1933 | Hutton | 137/114 |
| 2,347,204 | 4/1944 | Lindsay | 251/118 X |
| 2,984,467 | 5/1961 | Cedarholm | 261/69 R |
| 3,073,686 | 1/1963 | Harris | 137/99 X |

FOREIGN PATENT DOCUMENTS

| | | | |
|---|---|---|---|
| 815472 | 7/1949 | Fed. Rep. of Germany | 137/114 |
| 504418 | 12/1954 | Italy | 251/339 |

Primary Examiner—Robert G. Nilson
Attorney, Agent, or Firm—Reed Smith Shaw & McClay

[57] ABSTRACT

A control valve for injecting dilute concentrations of liquid additives to a fluid flow in which a housing (10) is connected to a core member (12) and a piston valve (18) that is slidingly maintained within the core member is controlled in response to the movement of a shut-off member (14) pivotally connected to the housing.

7 Claims, 1 Drawing Figure

U.S. Patent        Oct. 19, 1982        4,354,516
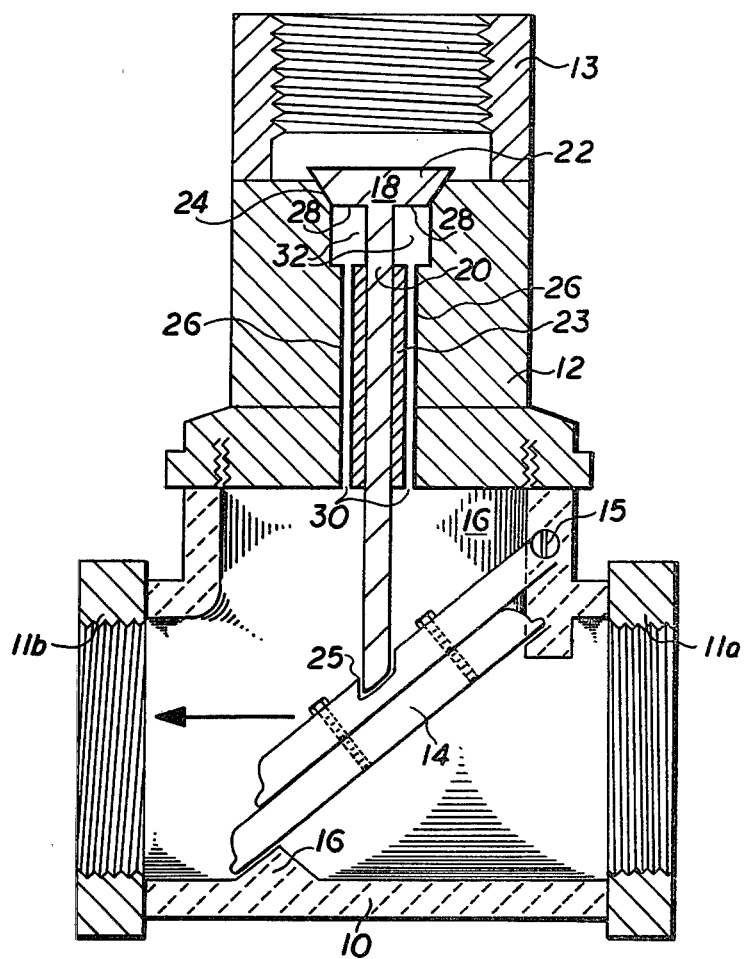

AUTOMATIC CONTROL VALVE

BACKGROUND OF THE INVENTION

1. Field of the Invention

The subject invention relates to valves and, more particularly, to control valves for metering additives to a fluid flow at a precisely controlled rate.

2. Description of the Prior Art

In the prior art, there has existed a need for a device that would provide an additive to a fluid flow in highly dilute concentration. For example, natural gas is generally distributed in pipeline systems wherein the gas is transmitted at pressures ranging between 100 and 3,400 lbs. Before the gas reaches the local distribution network, where the pressure can be as low as four to six ounces, alcohol must be added in amounts of about 60 parts per million to prevent concentration of entrained water vapor resulting in rusting of the gas burners. Additional additives are also combined with the gas in highly dilute concentration for other purposes. For example, mercaptian is provided in a proportion of about 3.7 parts per million to give the gas a detectable odor.

Regulated control valves known in the prior art are generally unsuited for use in applications when an additive is to be added to a fluid flow in dilute concentrations. U.S. Pat. Nos. 2,243,454 and 3,353,550 are generally illustrative. In the prior art, devices for metering additives into a fluid flow have generally provided these additives at a constant rate which is unregulated with respect to the rate of fluid flow. For example, in the gas industry, alcohol is generally metered from an injection tank into the transmission line through an ordinary globe valve. The position of the valve is set by an operator. The alcohol injection points are usually at remote locations where the operator is only infrequently in attendance. Accordingly, although the flow rate of gas in the transmission line may change or be cut off entirely, the alcohol continues to be metered through the globe valve at the initial rate until the operator returns, perhaps days or even weeks later. Consequently, considerable quantities of alcohol are wasted.

Other devices known in the prior art did not control the flow of the additives at all. Rather they operated merely in either open or closed modes in which the additive was allowed to flow freely or was stopped entirely. An example is shown in U.S. Pat. No. 3,905,451.

Although some mechanisms were known in the prior art that would regulate the flow of additives into a fluid stream, they provided insufficient regulation for many applications-particularly where the additives are in highly dilute concentrations. For example, U.S. Pat. No. 1,937,893 is directed to a device for providing rust inhibitors to a boiler water supply. As described therein, a vertically movable self-seating valve in the water supply line controls a ball valve that determines the flow of the rust inhibitors. However, the self-seating valve has a vertical freedom of movement such that due to line pressure fluctuation and turbulence in the water flow, the vertical position of the self-seating valve is not stable and precise regulation does not occur. Other examples are shown in U.S. Pat. Nos. 895,709 and 926,848 wherein carburetors are disclosed in which needle or drum type valves are responsive to the position of a suction valve. Although in U.S. Pat. No. 926,848 movement of the suction valve is damped, there is still insufficient regulation of the additive for use in applications where there are highly dilute concentrations.

SUMMARY OF THE INVENTION

In accordance with the subject invention, a control valve automatically meters a regulated flow of liquid into a fluid stream in highly dilute proportions. The valve includes a housing and a shut-off member that is pivotally connected at one end to the interior of the housing. The valve further includes a piston valve disposed such that its valve stem abuts the shut-off member. A core member that is connected to the housing maintains the valve stem within a sleeve portion thereof. The core member further includes at least one metering channel having one end port adjacent the head of said piston valve and another end port adjacent the interior of the housing.

Preferably, the core member includes a plurality of metering channels that are regularly arranged with respect to the sleeve portion. Also preferably, the metering channels include an enlarged cavity at the end adjacent the head of the piston valve.

Other details, objects and advantages of the invention will become apparent in the following description of a presently preferred embodiment thereof proceeds.

BRIEF DESCRIPTION OF THE DRAWING

The accompanying drawing shows a presently preferred embodiment of the invention in which the FIGURE is a front cross-section of the disclosed valve showing the details thereof.

PREFERRED EMBODIMENT OF THE INVENTION

As shown in the FIGURE, the control valve of the subject invention includes a housing (10) which is threadingly connected to a core member (12) having a threaded top portion (13), housing (10) having threaded ends (11a and 11b). Internally of housing (10), a shut-off member (14) is pivotally connected to the interior wall of housing (10) at one end of shut-off member (14) by pin (15). The inner wall of housing (10) is shaped to provide a seat (16) for shut-off member (14). A piston valve (18) having a valve stem (20) and a head (22) is maintained within a valve stem sleeve (23) of core member (12) such that one end of valve stem (20) abuts the top surface of shut-off member (14). Core member (12) is shaped to provide a seat (24) for head (22). Preferably, a notch (25) is provided in the top surface of shut-off member (14) to maintain the end of valve stem (20).

Core member (12) further includes at least one metering channel (26) having an input port (28) adjacent the bottom surface of head (22) and an output port (30) adjacent the interior of housing (10). Preferably, as shown in the Figure, core member (12) includes a plurality of metering channels (26) which are symmetrically arranged about valve stem sleeve (23) in a circular pattern. Also preferably, metering channels (26) include an enlarged cavity (32) at the end adjacent the input port (28).

In the operation of the disclosed device, threaded ends (11a and 11b) of housing (10) are engaged with the line that carrys the fluid with which the liquid additive is to be mixed. Also, the threaded top portion (13) of core member (12) is engaged with the supply line for the liquid additive.

Housing (10) is connected such that the fluid flows unidirectionally through housing (10) from end (11a) to end (11b) in the direction indicated by the arrow. When there is insufficient head pressure of the fluid to raise shut-off member (14) away from its seat (16), the position of the disclosed apparatus is as shown in the Figure with the circumferential surface of head (22) of piston valve (18) secured against valve seat (24). In this position, shut-off member (14) prevents fluid flow in the reverse direction from end (11b) to end (11a) of housing (10) and piston valve (18) prevents flow of the liquid additive from the top portion (13) of core member (12) adjacent above head (22).

As the head pressure of the fluid at end (11a) of housing (10) increases sufficiently to raise shut-off member (14) from seat (16), fluid flow developes between shut-off member (14) and seat (16) to which the liquid additive must be mixed in the correct proportion. The pivotal movement of shut-off member (14) about pin (15) urges piston valve (18) vertically upward creating a gap between head (22) and seat (24). The liquid additive flows through this gap and into metering channels (26) at input port (28). The fluid additive exits metering channels (26) at output ports (30) and is thoroughly mixed with the fluid flow due to the turbulent action of the fluid flow caused by the baffling effect of shut-off member (14).

The proportion in which the liquid additive is mixed with the fluid is dependent upon the angular relationship of shut-off member (14) with respect to piston valve (18). The rate of additive flow is also determined by the number, shape and arrangement of metering channels (26), and the angle of seat (24).

The precise diameter of metering channel (26) is determined in part, on the flow characteristics of the particular liquid additive in use. In the use of alcohol added to gas transmission lines, the diameter is in the range of 1/16 inch to ¼ inch. A preferred shape for metering channel (26) includes enlarged cavities (32) adjacent the input ports (28) thereof. It has been found that the use of metering channels of this general shape in combination with a piston valve such as piston valve (18) described herein affords a surprisingly precise degree of control over the rate at which the liquid is introduced into the fluid flow. Accordingly, there is provided a control vale that is particularly suited for mixing a liquid in extremely dilute concentration in a fluid stream.

While a presently preferred embodiment of the invention has been shown and described, it is to be understood that the invention is not limited thereto but may be otherwise variously embodied within the scope of the following claims.

I claim:

1. An automatic control valve for providing controlled amounts of liquid to a fluid stream, said valve comprising:
    a housing;
    a shut-off member pivotally connected to said housing;
    a piston valve having a valve stem that abuts said shut-off member such that said piston valve is responsive to the pivotal motion thereof; and
    a core member connected to said housing, said core member forming a seat for said valve and having a valve stem sleeve for maintaining valve stem and at least one metering channel passing through said core member and in communication with said housing.

2. The valve of claim 1 wherein said core member includes a plurality of metering channels that are symmetrically arranged with respect to said valve stem sleeve.

3. The valve of claim 1 or 2 wherein the metering channel in said core member includes an enlarged cavity at the end adjacent the valve seat.

4. The valve of claim 1 or 2 wherein the shut-off member is provided with a notch in which the end of the valve stem abutting the shut-off member is maintained.

5. The control valve as set forth in claim 1 wherein said fluid stream comprises a flow of natural gas advancing through said housing past said shut-off member; and wherein said liquid is a rust-inhibiting or an odor-providing material.

6. The control valve as set forth in claim 5 wherein said liquid is selected from the group consisting of alcohol and mercaptian.

7. A control valve for automatically metering liquid into a fluid stream at a precisely controlled rate, said valve comprising:
    a housing;
    a shut-off member pivotally connected to said housing;
    a piston valve having a head and having a valve stem that abuts said shut-off member such that said piston valve is responsive to the pivotal motion thereof; and
    a core member that maintains said piston valve, said core member having a channel with a first port adjacent the interior of said housing and a second port adjacent the head of said piston valve, wherein said core member includes a plurality of channels that are symmetrically arranged with respect to said piston valve.

* * * * *